US010726150B2

(12) United States Patent
Doshi

(10) Patent No.: US 10,726,150 B2
(45) Date of Patent: **\*Jul. 28, 2020**

(54) DETERMINATION OF DATA OBJECT EXPOSURE IN CLOUD COMPUTING ENVIRONMENTS

(71) Applicant: PALO ALTO NETWORKS, INC., Santa Clara, CA (US)

(72) Inventor: Nishant Doshi, Santa Clara, CA (US)

(73) Assignee: PALO ALTO NETWORKS, INC., Santa Clara, CA (US)

( \* ) Notice: Subject to any disclaimer, the term of this patent is extended or adjusted under 35 U.S.C. 154(b) by 304 days.

This patent is subject to a terminal disclaimer.

(21) Appl. No.: 15/585,501

(22) Filed: May 3, 2017

(65) Prior Publication Data

US 2017/0235973 A1 Aug. 17, 2017

Related U.S. Application Data

(63) Continuation of application No. 14/298,348, filed on Jun. 6, 2014, now Pat. No. 9,661,065.

(Continued)

(51) Int. Cl.
| | |
|---|---|
| *G06F 21/62* | (2013.01) |
| *H04L 29/08* | (2006.01) |
| *H04L 29/06* | (2006.01) |
| *G06F 21/57* | (2013.01) |
| *G06F 9/46* | (2006.01) |

(52) U.S. Cl.
CPC ............ *G06F 21/6245* (2013.01); *G06F 9/46* (2013.01); *G06F 21/577* (2013.01); *G06F 21/6218* (2013.01); *H04L 63/04* (2013.01); *H04L 67/10* (2013.01); *H04L 67/1002* (2013.01)

(58) Field of Classification Search
USPC .......................................................... 706/47
See application file for complete search history.

(56) References Cited

U.S. PATENT DOCUMENTS

| | | | | |
|---|---|---|---|---|
| 8,307,435 B1 * | 11/2012 | Mann | ..................... | G06F 21/566 |
| | | | | 714/38.1 |
| 8,627,407 B1 * | 1/2014 | Satish | ..................... | G06F 21/36 |
| | | | | 709/229 |

(Continued)

OTHER PUBLICATIONS

Geoffrey C. Fox, et al., "Architecture and measured characteristics of a cloud based Internet of things", 2012 International Conference on Collaboration Technologies and Systems (CTS); Year: 2012; pp. 6-12, DOI: 10.1109/CTS.2012.6261020 IEEE Conference Publications.

(Continued)

*Primary Examiner* — Michael B Homes
(74) *Attorney, Agent, or Firm* — Gilliam IP PLLC

(57) ABSTRACT

Embodiments disclosed herein provide systems, methods, and computer readable media for indicating data object exposure in a cloud computing environment. In a particular embodiment, a method provides receiving information about a data object from the cloud computing environment. The method further provides analyzing the information to determine a plurality of exposure characteristics for the data object. The method further includes determining an indication of exposure of the data object based on the plurality of exposure characteristics.

20 Claims, 6 Drawing Sheets

Related U.S. Application Data

(60) Provisional application No. 61/984,923, filed on Apr. 28, 2014.

(56) References Cited

U.S. PATENT DOCUMENTS

| | | | | |
|---|---|---|---|---|
| 9,083,729 | B1* | 7/2015 | Doshi | H04L 63/1408 |
| 9,661,065 | B2* | 5/2017 | Doshi | H04L 67/10 |
| 9,736,538 | B2* | 8/2017 | Doshi | H04N 21/47202 |
| 9,807,079 | B2* | 10/2017 | Doshi | H04L 63/0815 |
| 9,807,182 | B2* | 10/2017 | Doshi | H04L 67/22 |
| 10,349,139 | B2* | 7/2019 | Doshi | H04N 21/2407 |
| 2013/0268944 | A1* | 10/2013 | Fellenstein | G06F 8/61 |
| | | | | 718/104 |
| 2014/0075500 | A1* | 3/2014 | B'far | H04L 63/102 |
| | | | | 726/1 |
| 2015/0020127 | A1 | 1/2015 | Doshi | |
| 2015/0100509 | A1 | 4/2015 | Pappas et al. | |
| 2015/0310333 | A1 | 10/2015 | Doshi | |
| 2015/0312262 | A1 | 10/2015 | Doshi | |
| 2016/0119325 | A1 | 4/2016 | Doshi | |

OTHER PUBLICATIONS

Jiuyaun Huo, et al., "Design and implementation of automatic defensive websites tamper-resistant based on OpenStack system", 2015 4th International Conference on Computer Science and Network Technology (ICCSNT) Year: 2015, vol. 01, pp. 280-284, DOI: 10.1109/ICCSNT.2015.7490752 IEEE Conference Publications.

George Baciu, et al., "Cloudets: Cloud-based cognition for large streaming data", 2015 IEEE 14th International Conference on Cognitive Informatics & Cognitive Computing (ICCI*CC) Year: 2015, pp. 333-338, DOI: 10.1109/ICCI-CC.2015.7259407 IEEE Conference Publications.

Paolo Bellavista, et al., "Priority-Based Resource Scheduling in Distributed Stream Processing Systems for Big Data Applications", 2014 IEEE/ACM 7th International Conference on Utility and Cloud Computing, Year: 2014, pp. 363-370, DOI: 10.1109/UCC.2014.46 IEEE Conference Publications.

* cited by examiner

| SETTINGS 601 | | METADATA 602 | |
|---|---|---|---|
| USER | John Doe | TYPE | File |
| AMT. SHARED | 2 | LAST ACCESS | 3 Days |
| PUBLIC FLDR. | No | PARENT FLDR. | HR |

| SETTINGS 701 | | METADATA 702 | |
|---|---|---|---|
| USER | John Doe | TYPE | File |
| AMT. SHARED | 0 | LAST ACCESS | 20 min. |
| PUBLIC FLDR. | Yes | PARENT FLDR. | Misc. |

Figure 8

DETERMINATION OF DATA OBJECT EXPOSURE IN CLOUD COMPUTING ENVIRONMENTS

RELATED APPLICATIONS

This application is a continuation of U.S. patent application Ser. No. 14/298,348, entitled "DETERMINATION OF DATA OBJECT EXPOSURE IN CLOUD COMPUTING ENVIRONMENTS," filed on Jun. 6, 2014, and claims priority to U.S. Provisional Patent Application No. 61/984,923, entitled "DETERMINATION OF DATA OBJECT EXPOSURE IN CLOUD COMPUTING ENVIRONMENTS," filed on Apr. 28, 2014, and which are hereby incorporated by reference in their entirety.

TECHNICAL BACKGROUND

Cloud computing is becoming more prevalent. Some of the more basic cloud computing services store files so that the files can be accessed from any computer system that is able to log into the cloud computing service storing the files. More complex cloud computing services provide a remote platform for providing their services to customers. These more complex cloud computing services are sometimes referred to as Software as a Service (SaaS), Platform as a service (PaaS), and Infrastructure as a Service (IaaS).

While various cloud computing services provide services to individuals, some cloud computing services also provide services to entities. For example, a business entity may subscribe to a particular cloud computing service for use by employees of the business entity. Each of the employees may be able to independently modify access settings for data objects maintained in the cloud computing service. Consequently, the entity may not be aware when settings for the data objects provide more exposure for the object than would be desired by the entity. For example, an entity may prefer that settings for an object prevent access by people or applications outside of the entity because of sensitive information within the object but has no practicable means of enforcing such a preference.

OVERVIEW

Embodiments disclosed herein provide systems, methods, and computer readable media for indicating data object exposure in a cloud computing environment. In a particular embodiment, a method provides receiving information about a data object from the cloud computing environment. The method further provides analyzing the information to determine a plurality of exposure characteristics for the data object. The method further includes determining an indication of exposure of the data object based on the plurality of exposure characteristics.

In some embodiments, the method provides that determining an indication of exposure of the data object based on the plurality of exposure characteristics comprises applying a plurality of rules to the plurality of exposure characteristics and generating the indication based on how well the plurality of exposure characteristics comply with the plurality of rules.

In some embodiments, the method provides analyzing the information to determine a classification for the data object and, in some embodiments, the classification corresponds to a business unit.

In some embodiments, receiving information about a data object from the cloud computing environment comprises using Application Programming Interface (API) calls for the cloud computing environment to request the information and, in some embodiments, using API calls for the cloud computing environment to request the information comprises impersonating a user associated with the data object, wherein the API calls comprise API calls only available to the user.

In some embodiments, the method provides generating a notification of the indication and remedial actions that will improve the exposure if performed.

In some embodiments, the cloud computing environment includes at least two cloud computing services that each maintain a copy of the data object. In those embodiments, receiving information about a data object from the cloud computing environment comprises receiving first information about the data object from a first cloud computing service of the cloud computing services and receiving second information about the data object from a second cloud computing service of the cloud computing services.

In some embodiments, the information includes accessibility settings for the data object and, in some embodiments, the information includes a user associated with the data object.

In another embodiment, a computer readable storage medium is provided having instructions stored thereon for operating an exposure analysis system to indicate data object exposure in a cloud computing environment. The instructions, when executed by the exposure analysis system, direct the exposure analysis system to receive information about a data object from the cloud computing environment. The instructions further direct the system to analyze the information to determine a plurality of exposure characteristics for the data object and determine an indication of exposure of the data object based on the plurality of exposure characteristics.

In yet another embodiment, an exposure analysis system is provided for indicating data object exposure in a cloud computing environment. The exposure analysis system includes a network communication interface configured to receive information about a data object from the cloud computing environment. The exposure analysis system further includes a processing system configured to analyze the information to determine a plurality of exposure characteristics for the data object and determine an indication of exposure of the data object based on the plurality of exposure characteristics.

BRIEF DESCRIPTION OF THE DRAWINGS

FIG. 8 illustrates data object characteristics for indicating data object exposure in a cloud computing environment.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
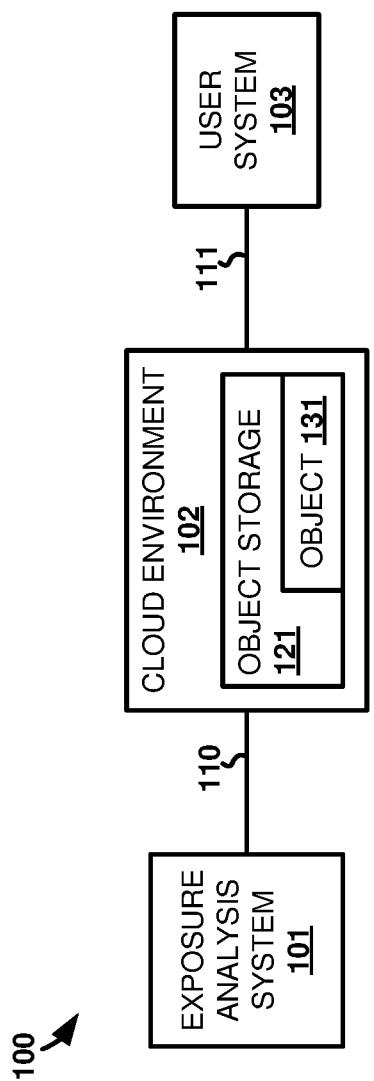
FIG. 1 illustrates a cloud computing system for indicating data object exposure in a cloud computing environment.

FIG. 1 illustrates cloud computing system 100. Cloud computing system 100 includes exposure analysis system 101, cloud computing environment 102, and user system 103. Cloud computing environment 102 includes object storage 121, which stores data object 131. Exposure analysis system 101 and cloud computing environment 102 communicate over communication link 110. Cloud computing environment 102 and user system 103 communicate over communication link 111.

In operation, cloud computing environment 102 provides one or more cloud computing services to user system 103. While not shown, cloud computing environment 102 may also provide services to any number of user systems beyond user system 103. The services provided by cloud computing environment 102 may include file storage and sharing, document collaboration, client and customer management services, cloud based operating system execution, or any other possible service that may be provided to a user via a remote computing platform. Example cloud services include BOX, DROPBOX, SALESFORCE, YAMMER, FACEBOOK, EVERNOTE, or any other SaaS, PaaS, or IaaS. Object storage 121 is used by cloud computing environment 102 to store information related to the services provided. Accordingly, data object 131 is any data object that is maintained by cloud computing environment 102 for providing the service. For example, data object 131 may be structured or unstructured data, such as a file uploaded to cloud computing environment 102 from user system 103, a customer relationship management object, or other data, possibly organized into tables, lists, and the like, corresponding to interactions, notes, status updates, and the like for a particular client in cloud based client management software.

Regardless of what data object 131 is in cloud computing environment 102, data object 131 the services provided by cloud computing environment 102 may allow data object 131 to be exposed to undesired users. When used herein, exposure means that data object 131 be retrieved, viewed, changed, or otherwise accessed—including combinations thereof—by users, systems, or applications beyond what may be desired by the user of user system 103 or other interested party, such as that user's employer. For example, a cloud storage service may provide public folders in which anyone who finds the folder can access files stored therein.

In order to prevent data objects from being overly exposed, exposure analysis system 101 analyzes characteristics of data objects stored in cloud environment 102 to determine an indication for the exposure of each object. In a basic example, the exposure for a data object stored in a public folder may be considered greater than the exposure for that same data object stored in a private folder and shared only with a limited number of people. The user or a supervisor of the user may be notified of the exposure indication so that changes to the data object's exposure characteristics can be made if desired.

Figure 2:
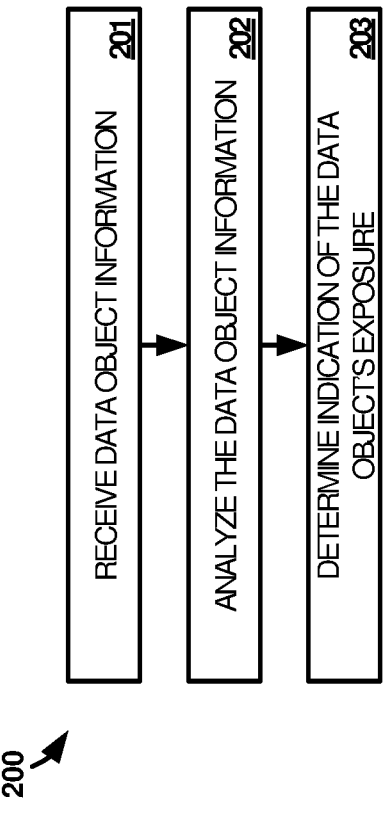
FIG. 2 illustrates an operation of the cloud computing system to indicate data object exposure in a cloud computing environment.

FIG. 2 illustrates operation 200 of cloud computing system 100 to indicate data object exposure. The method of operation includes exposure analysis system 101 receiving information about data object 131 from cloud computing environment 102 (step 201). The information is analyzed to determine exposure characteristics for data object 131 (step 202). An indication for exposure of data object 131 is determined based on the exposure characteristics (step 203).

The information may be received over a communication network or may be received in any other manner by which a computer system could receive data, including reading the information off of optical disks or other type of removable media. Additionally, the functionality of exposure analysis system 101 may be integrated into a service of could computing environment 102. In those situations, the information may be received from other elements of the service.

The exposure characteristics may include items of the information that explicitly indicate an object's exposure, such as access settings for data object 131 or a location/container in which data object 131 is stored within cloud computing environment 102, or a number of individuals or applications that are given access to data object 131, and the like. Additionally, the exposure characteristics may be identified from items of information that do not explicitly indicate the exposure of data object 131, such as reputation of the user (i.e. the user of user system 103) associated with object 131, past exposure analysis of data object 131, time since data object 131 was last accessed, age of data object 131, who is accessing data object 131, who is allowed to access data object 131, who has accessed data object 131 at certain times in the past, number of users able to access data object 131, number of untrusted users able to access data object 131, exposure indications of other objects in a same container (e.g. folder) as data object 131, a type of data contained in data object 131, a number of user systems through which data object 131 is accessed, a number of systems used to access a user account under which data object 131 is maintained, firewall logs, or any other information that may indicate an exposure level of data object 131.

The indication is calculated from the exposure characteristics and may be expressed as a value on a number scale (e.g. 1 to 10, with 10 indicating high exposure, or vice versa), a percentage, a rank in relation to other objects, a multi-level scale (e.g. poor, satisfactory, good, best), or any other way in which severity of exposure may be expressed. Exposure analysis system 101 may weigh different exposure characteristics differently when determining the indication. For example, the reputation of a particular user with whom data object 131 is shared may affect the exposure indication of data object 131 more so than the number of users with whom data object 131 is shared. In some examples, these weights may be determined based on rules that indicate importance of certain characteristics over others. Additionally, the indication may be separated into multiple distinct indicators that each indicate exposure relative to specific criteria. For example, one indicator may correspond to overall exposure while another indicator may correspond to an exposure relative to a regulatory scheme, governmental or otherwise. Similarly, the multiple indicators may indicate different types of disclosure. For example, one indicator may indicate exposure to the public while another indicator may indicate exposure to other departments within the same entity.

In some embodiments, exposure analysis system 101 may be configured to learn which exposure characteristic combinations correspond to which indications of exposure. For example, exposure analysis system 101 may be provided with data objects, exposure characteristics for each of those data objects, and an exposure indication for each data object. Exposure analysis system 101 is then able to correlate particular exposure characteristics with particular indications. Exposure analysis system 101 uses this correlation to generate an exposure indication for objects having similar characteristics to those provided during the learning process.

Advantageously, the embodiment described above allows exposure analysis system 101 to indicate exposure for objects stored in cloud computing environment 102. This exposure indication information may be supplied to a user of user system 103 or another interested party, such as an entity or enterprise associated with the user of user system 103, which includes third parties. The interested party will therefore be aware of exposure issues that it would not have known about otherwise.

Referring back to FIG. 1, exposure analysis system 101 comprises a computer system and communication interface. Exposure analysis system 101 may also include other components such as a router, server, data storage system, and power supply. Exposure analysis system 101 may reside in a single device or may be distributed across multiple devices. Exposure analysis system 101 is shown externally to cloud computing environment 102, but system 101 could be integrated within the components of cloud computing environment 102. Exposure analysis system 101 could be an application server, a personal workstation, a service node, or some other network capable computing system—including combinations thereof.

Cloud computing environment 102 comprises a computer system, communication interface and object storage 121. Cloud computing environment 102 may also include other components such as a router, server, and power supply. Cloud computing environment 102 may reside in a single device or may be distributed across multiple devices. Cloud computing environment 102 may include multiple cloud services each provided by multiple systems and not necessarily co-located or operated by a common entity (e.g. may include a cloud storage service provided by one company and a customer management service provided by another company). Cloud computing environment 102 could be an application server, service node, or some other computing system—including combinations thereof.

User system 103 comprises a computer system and a communication interface. User system 103 may also include a user interface, memory device, software, processing circuitry, or some other communication components. User system 103 may be a telephone, tablet, computer, e-book, mobile Internet appliance, wireless network interface card, media player, game console, or some other end user computing apparatus—including combinations thereof.

Communication links 110-111 could use various communication protocols, such as Time Division Multiplex (TDM), Internet Protocol (IP), Ethernet, communication signaling, Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other communication format—including combinations thereof. Communication links 110-111 could be direct links or may include intermediate networks, systems, or devices.

Figure 3:
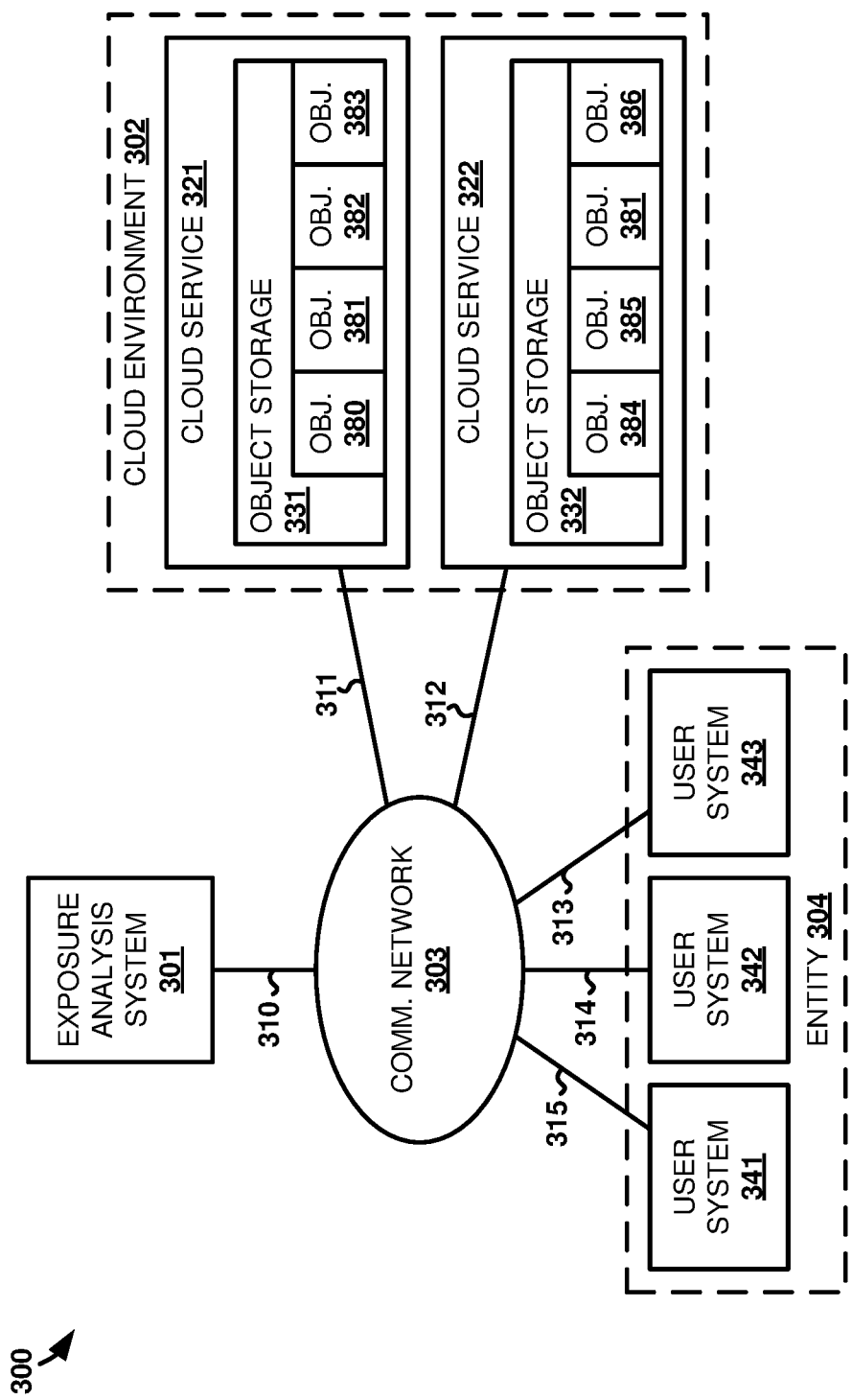
FIG. 3 illustrates a cloud computing system for indicating data object exposure in a cloud computing environment.

FIG. 3 illustrates cloud computing system 300. Cloud computing system 300 includes exposure analysis system 301, cloud computing service 321, cloud computing service 322, user systems 341-343, and communication network 303. Cloud computing service 321 includes object storage 331 that stores data objects 380, 381, 382, and 383. Similarly, cloud computing service 322 includes object storage 332 that stores data objects 384, 385, 381, and 386.

Communication network 303 comprises network elements that provide communications services to exposure analysis system 301, cloud services 321-322, and user systems 341-343. Communication network 303 may comprise switches, wireless access nodes, Internet routers, network gateways, application servers, computer systems, communication links, or some other type of communication equipment—including combinations thereof. Communication network 303 may include wide area networks, local area networks, the Internet, or other types of networks—including combinations thereof.

In operation, users associated with entity 304 operate user systems 341-343. User systems 341-343 may be provided to the users by entity 304 or may otherwise be able to access services to which entity 304 subscribes. In this example, entity 304 is a business enterprise and the users are employees of that business. Entity 304 subscribes to services provided by cloud services 321 and 322 for the employees of entity 304. Cloud services 321 and 322 may be otherwise unrelated cloud services operated by independent entities but, for the purposes of this example, are considered part of cloud computing environment 302 for entity 304. Each employee receives individual login information to individual accounts on each of services 321 and 322 and can use each of the services to the extent that entity 304 is subscribed (e.g. within the limits of entity 304's service agreement).

To ensure no sensitive information becomes overly exposed during the employee's use of cloud services 321 and 322, entity 304 uses exposure analysis system 301 to inform entity 304 about the exposure of data objects be maintained on behalf of its employees. Exposure analysis system 301 may be controlled directly by entity 304 (i.e. may be owned or operated by entity 304) or entity 304 may subscribe to services provided by exposure analysis system 301 through a third party operator of exposure analysis system 301.

Figure 4:
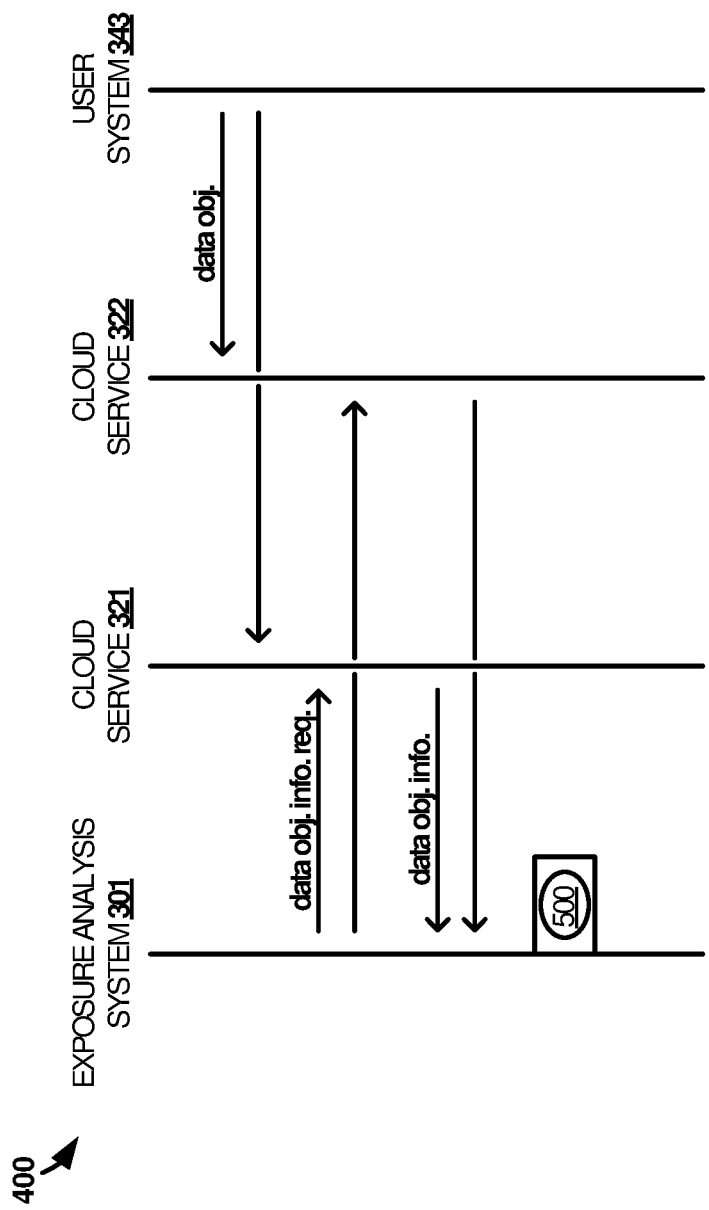
FIG. 4 illustrates an operation of the cloud computing system to indicate data object exposure in a cloud computing environment.

FIG. 4 illustrates operation 400 of cloud computing system 300 to indicate data object exposure. Specifically, operation 400 illustrates the generation of exposure indications for data objects 380-386 maintained by cloud services 321-322 for the employee operating user system 343. A similar method is used to analyze data objects of other employees. Additionally, it should be understood that a single employee might use more than one user system to access data objects in cloud service. For example, an employee may access cloud services 321 and 322 using a phone, tablet, personal computer, and a web interface.

Operation 400 begins with the employee using user system 343 creating objects 380-386 in the employee's account in cloud services 321-322 as pictured in FIG. 3. To create the objects, the objects may be uploaded to cloud services 321-322, may be generated at cloud services 321-

322 in response to directions from user system 343, or may become stored in cloud service 321-322 by some other means. One particular data object 381 is located in both cloud service 321 and cloud service 322.

Exposure analysis system 301 then uses Application Programming Interface (API) calls for each of cloud services 321-322 to request data object information pertaining to exposure characteristics. For example, the data object information may include settings, metadata, or any other type of information about the object. The API used for each of cloud services 321-322 may include the same API calls typically used by user systems to interact with the cloud services. For example, there may be an API call for one or more of cloud services 321-322 that allows a user to request with whom a particular data object is shared. In some examples, even though entity 304 is subscribing to cloud services 321-322 on behalf of its employees, one or more of cloud services 321-322 may not allow entity 304 to use certain API calls to access user specific information. In those cases, exposure analysis system 304 impersonates individual users so that exposure analysis system 304 can request the information. The impersonation may be performed with the consent of the user since the user is an employee of entity 304 and is using a service subscribed to by entity 304.

In some embodiments, one or more of cloud services 321-322 may provide APIs that allow code to execute within the cloud service on behalf of exposure analysis system 301. In those examples, the code may transfer exposure information to exposure analysis system 304 periodically or upon certain triggers. For example, upon settings for a particular object being changed, the code may instruct the cloud service to transfer a notification of those changes to exposure analysis system 301.

Figure 5:
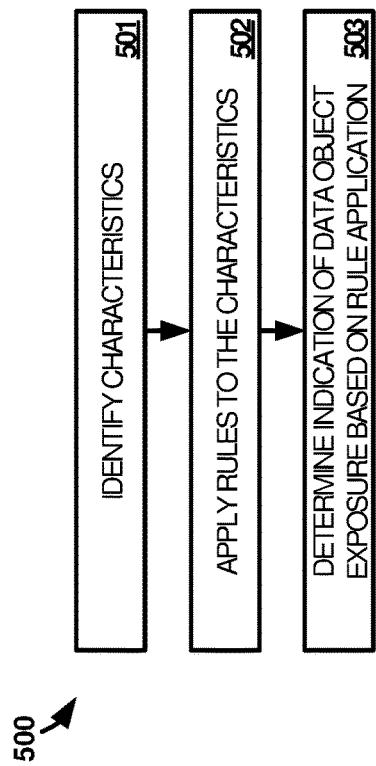
FIG. 5 illustrates an operation of the cloud computing system to indicate data object exposure in a cloud computing environment.

Once the requested data object information is received by exposure analysis system 301, exposure analysis system 301 analyses the information in accordance with operation 500 in FIG. 5. In particular, exposure analysis system 301 identifies exposure characteristics from the received data object information (step 501). Rules are then applied to the exposure characteristics for each data object (step 502). The rules may be business rules identified by entity 304 based on exposure characteristics that entity 304 believes are desirable for certain types of data objects, data objects containing certain subject matter, data objects for certain types of employees, or any other reason that an entity may want to limit exposure to particular data objects.

Based on how the exposure characteristics for each data object satisfy the rules, exposure analysis system 301 determines an indication for the exposure of each object (step 503). For example, if characteristics for a particular data object fall within all the applicable rules, then the indication for that object will indicate a low danger of exposure. An object may fall within the rules for different reasons. For instance, the object may contain sensitive information but its characteristics indicate that it is not at risk of being accessed by anyone outside of the employee that created it. Alternatively, the object may be publicly accessible but not contain sensitive information and, therefore, does not require a high exposure danger.

Upon determining the exposure indications for the data objects, exposure analysis system 301 may notify entity 304 of the indications. For example, a notification may be sent to an administrator within entity 304 via email, a dedicated application for interacting with exposure analysis system 301, a web interface to exposure analysis system 301, or by some other notification means. A notification may further be sent to the employee under whose account the data objects are located. In the present example, the employee would be the employee operating user system 343. In alternative examples, the notification may be displayed as part of a graphical representation of the object when a user accesses the cloud service. That is, the way in which the object is displayed to a user may be changed based on the indication of exposure. For example, the listing of a file object in a cloud storage service may change color based on the indication of exposure (e.g. a highly exposed object may be presented in the color red).

In some examples, the notification only indicates data objects having high indications for danger of exposure or indications above a predetermined threshold. The notification may also indicate specific reasons as to why a data object was determined to have a particular indication (e.g. which exposure characteristics did not satisfy the rules). Such an indication may allow a user to change the offending characteristics of the object to improve the objects exposure. Similarly, in some examples, the notification may explicitly set forth recommended actions that can be taken to improve the object's exposure. These actions may include both automatic (which may also be performed by system 301 without notification) and manual remedial actions that can reduce or eliminate the object's risk of exposure. For example, the actions may include changing access settings for the object, such as disabling a public link to the object, expiring the link, remove user access, modifying or encrypting the data object, deleting the data object, or notifying the data owner or manager. Exposure analysis system 301 may also log the notification data in an incident module for future access. Similarly, exposure analysis system 301 may update metadata associated with the object to indicate exposure, a processes commonly referred to as metadata tagging.

Using exposure analysis system 301 in the manner described above, entity 304 can ensure that its employees are not using cloud computing services 321-322 in a manner that would expose information that entity 304 would not want disclosed.

Figure 6:
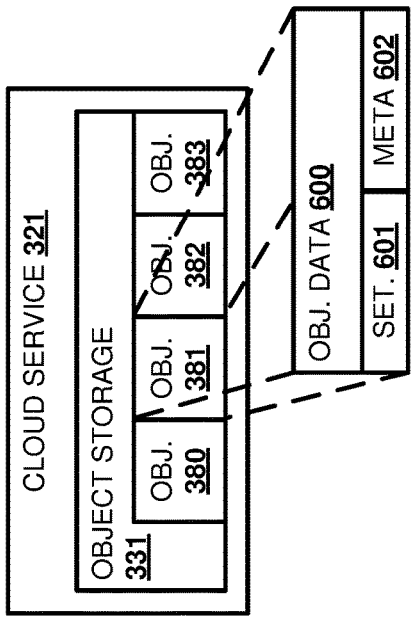
FIG. 6 illustrates a cloud computing service for indicating data object exposure in a cloud computing environment.

FIG. 6 illustrates a more detailed version of cloud computing service 321. Specifically, FIG. 6 illustrates a blow up of data object 381 on cloud service 321. Data object 381 includes object data 600, settings 601, and metadata 602. Data objects 380, 382, and 383 include settings and metadata as well but are not shown for clarity. While settings 601 and metadata 602 are shown as being part of data object 381, cloud service 321 may maintain settings 601 and metadata 602 elsewhere. For example, cloud service 321 may maintain a separate data structure for storing such information in association with each data object. When exposure analysis system 301 requests information related to data object 381 in accordance with operation 400, cloud service 321 transfers at least a portion of settings 601 and metadata 602 in response to the request. In some examples, depending on whether entity 304 allows exposure analysis system 301 to access object data, at least a portion of object data 600 is also transferred to exposure analysis system 301 for exposure analysis.

Figure 7:
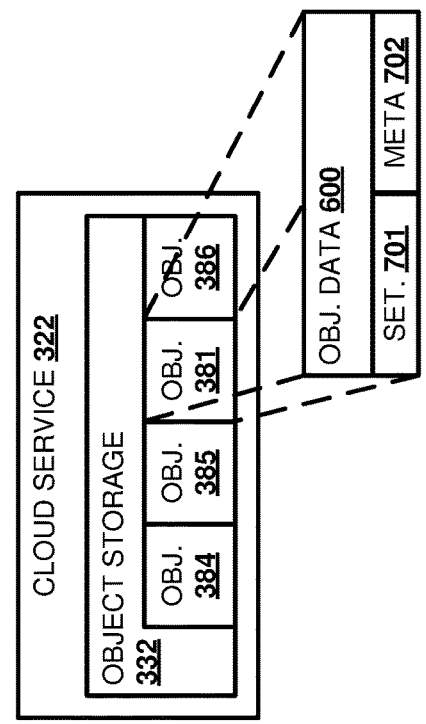
FIG. 7 illustrates a cloud computing service for indicating data object exposure in a cloud computing environment.

FIG. 7 illustrates a more detailed version of cloud computing service 322. Specifically, FIG. 7 illustrates a blow up of data object 381 on cloud service 322 rather than cloud service 321. Data object 381 includes object data 600, settings 701, and metadata 702. Data objects 384, 385, and 386 include settings and metadata as well but are not shown for clarity. Since cloud service 322 is separate from cloud service 321, while object data 600 may be the same on cloud service 322, settings 701 and metadata 702 are different for cloud service 322 than settings 601 and metadata 602 for cloud service 321. The settings and metadata may be different due to the differences in cloud computing platforms between services 321 and 322. Likewise, the settings and metadata may be configured to have different exposure levels on each service.

As is the case with cloud service 321, while settings 701 and metadata 702 are shown as being part of data object 381, cloud service 322 may maintain settings 701 and metadata 702 elsewhere. For example, cloud service 322 may maintain a separate data structure for storing such information in association with each data object. When exposure analysis system 301 requests information related to data object 381 in accordance with operation 400, cloud service 322 transfers at least a portion of settings 701 and metadata 702 in response to the request. In some examples, depending on whether entity 304 allows exposure analysis system 301 to access object data, at least a portion of object data 600 is also transferred to exposure analysis system 301 for exposure analysis.

In some embodiments, if exposure analysis system 301 is allowed to receive object data 600, exposure analysis system 301 uses object data 600 to classify data object 381 as being related to a particular business unit, topic, or other form of classification. For example, exposure analysis system 301 may review the contents of object data 600 to determine that data object 381 is a legal document that should not be shared outside of entity 304's legal department for any reason in accordance with the rules. Therefore, exposure analysis system 301 determines an indication that data object 381 as having a high danger of exposure if it is available for access by individuals outside of the legal department.

Furthermore, if data object 381 has been classified into a particular grouping (e.g. business unit), then a notification message indicating data object 381's exposure can be directed to an administrator in charge of the data maintained by people within that grouping rather than an administrator in charge of all data. Similarly, such an administrator may receive notifications that represent exposure in the aggregate for multiple data objects classified in the same grouping. Likewise, the classification of objects allows for a high level notification report that may include which set(s) of users have exposure issues, which Business units have exposure issues, which classifications have exposure issues, which classifications of documents have exposure issues, or any other way in which the exposure of data objects may be grouped.

In other examples, exposure analysis system 301 is able to classify data object 381 without having access to object data 600. In those examples, a user may aid exposure analysis system 301 by indicating a classification or exposure analysis system 301 may infer a classification based on other information, such as the name of a container (e.g. folder) for data object 381, a position of the employee operating user system 343 and having the account under which data object 381 is maintained (e.g. a legal department employee likely manages legal documents), or other information that may suggest a classification for a data object.

In some embodiments, if a separate indication of exposure is determined for data object 381 in each of cloud services 321 and 322, then a notification may be generated if the indications of exposure differ by more than a threshold. The notification may simply indicate the anomaly or may indicate specific exposure characteristics that caused the difference in exposure indications. For example, if the exposure indication is a rank on a scale of 1 to 10, with one being the most exposed, exposure analysis system 301 will generate a notification if data object 381 has a rank of 3 in one service and 8 in the other. This notification may be presented to any individual or system to which notifications may be sent as discussed elsewhere herein. A similar principle may be applied to objects of the same type within one or more of the services, not just identical objects across services.

FIG. 8 illustrates at least a portion of the data object characteristics that are included in settings 601 and 701 and metadata 601 and 702. Upon receiving these characteristics, exposure analysis system 301 analyzes the characteristics using rules in operation 500 described above. Specifically, how setting and metadata for an object may differ between cloud services 321 and 322.

Settings 601 indicate that data object 381 is under user John Doe's account (from which exposure analysis system 301 may be able to determine other employee information), is being shared with 2 other users (some examples may identify those users and indicate whether those other users are employees of entity 304), and is not located in a publicly accessible folder. Metadata 602 indicates that object data 381 is a file, it was last accessed 3 days ago, and is a Human Resources (HR) file.

In contrast, settings 701 indicate that data object 381 is being shared with no other users but is located in a publicly accessible folder. Metadata 702 indicates that object data 381 is a file, it was last accessed 22 minutes ago, and is located in a folder labeled miscellaneous.

Based on settings 601/701 and metadata 602/702, exposure analysis system 301 may determine that data object 381 on cloud service 321 is of low danger for exposure because it is only shared with 2 other users, and has not been accessed recently. However, data object 381 on cloud service 322 has been accessed much more recently and is publicly accessible. Since HR files may include confidential employee information, the rules used by exposure analysis system 301 indicate that HR files should not be made publicly available. Therefore, despite being a low risk for exposure on cloud service 321, data object 381 is given an indication of high danger of exposure because of its exposure characteristics on cloud service 322 (this may further indicate that data object 381 was inadvertently placed in the miscellaneous folder). In some examples, data object 321 may be assigned two separate indications corresponding to each cloud service.

Exposure analysis system 301 then notifies entity 304 of data object's exposure indication. Entity 304 is then aware that actions need to be taken to ensure data object 381's exposure indication is brought to within acceptable limits.

Figure 9:
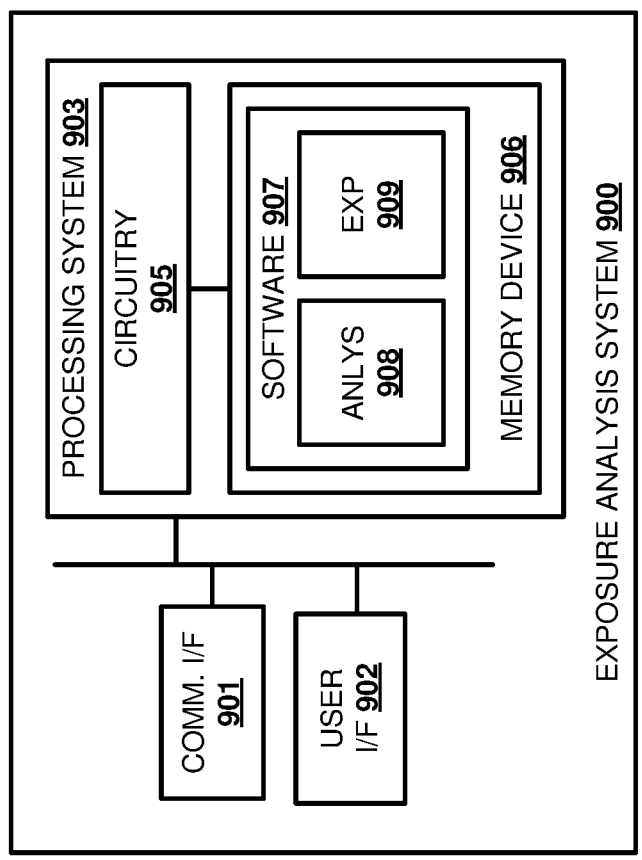
FIG. 9 illustrates an exposure analysis system for indicating data object exposure in a cloud computing environment.

FIG. 9 illustrates exposure analysis system 900. Exposure analysis system 900 is an example of exposure analysis systems 101 and 301, although systems 101 and 301 may use alternative configurations. Exposure analysis system 900 comprises communication interface 901, user interface 902, and processing system 903. Processing system 903 is linked to communication interface 901 and user interface 902. Processing system 903 includes processing circuitry 905 and memory device 906 that stores operating software 907.

Communication interface 901 comprises components that communicate over communication links, such as network cards, ports, RF transceivers, processing circuitry and software, or some other communication devices. Communication interface 901 may be configured to communicate over metallic, wireless, or optical links. Communication interface 901 may be configured to use TDM, IP, Ethernet, optical networking, wireless protocols, communication signaling, or some other communication format—including combinations thereof.

User interface 902 comprises components that interact with a user. User interface 902 may include a keyboard, display screen, mouse, touch pad, or some other user input/output apparatus. User interface 902 may be omitted in some examples.

Processing circuitry 905 comprises microprocessor and other circuitry that retrieves and executes operating software 907 from memory device 906. Memory device 906 comprises a non-transitory storage medium, such as a disk drive, flash drive, data storage circuitry, or some other memory apparatus. Operating software 907 comprises computer programs, firmware, or some other form of machine-readable processing instructions. Operating software 907 includes exposure characteristics analysis module 908 and exposure indication module 909. Operating software 907 may further include an operating system, utilities, drivers, network interfaces, applications, or some other type of software. When executed by circuitry 905, operating software 907 directs processing system 903 to operate exposure analysis system 900 as described herein.

In particular, exposure characteristics analysis module 908 directs processing system 903 to receive information about a data object from the cloud computing environment. Module 908 further directs processing system 903 to analyze the information to determine a plurality of exposure characteristics for the data object. Exposure indication module 909 directs processing system 903 to determine an indication of exposure of the data object based on the plurality of exposure characteristics.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of indicating data object exposure in a cloud computing environment, comprising:
   analyzing information about a data object in the cloud computing environment to determine a plurality of exposure characteristics for the data object, wherein each exposure characteristic of the plurality of exposure characteristics comprises one or more items of the information that indicate exposure of the data object, and wherein the exposure of the data object comprises accessibility of the data object beyond what is desired by an interested party to the data object; and
   determining an indication of the exposure of the data object based on the plurality of exposure characteristics.

2. The method of claim 1, wherein determining the indication of exposure of the data object based on the plurality of exposure characteristics comprises:
   applying a plurality of rules to the plurality of exposure characteristics; and
   generating the indication based on how well the plurality of exposure characteristics comply with the plurality of rules.

3. The method of claim 1, further comprising:
   analyzing the information to determine a classification for the data object.

4. The method of claim 3, wherein the classification corresponds to a business unit.

5. The method of claim 1, further comprising:
   receiving the information about the data object from the cloud computing environment using Application Programming Interface (API) calls for the cloud computing environment to request the information.

6. The method of claim 5, wherein using API calls for the cloud computing environment to request the information comprises:
   impersonating a user associated with the data object, wherein the API calls comprise API calls only available to the user.

7. The method of claim 1, further comprising:
   generating a notification of the indication and remedial actions that will improve the exposure if performed.

8. The method of claim 1, wherein the cloud computing environment includes at least two cloud computing services that each maintain a copy of the data object and the method further comprising:
   receiving first information of the information about the data object from a first cloud computing service of the cloud computing services; and
   receiving second information of the information about the data object from a second cloud computing service of the cloud computing services.

9. The method of claim 1, wherein the information includes accessibility settings for the data object.

10. The method of claim 1, wherein the information includes a user associated with the data object.

11. A non-transitory computer readable storage medium having instructions stored thereon for operating an exposure analysis system to indicate data object exposure in a cloud computing environment, the instructions, when executed by the exposure analysis system, direct the exposure analysis system to:
   analyze information about a data object in the cloud computing environment to determine a plurality of exposure characteristics for the data object, wherein each exposure characteristic of the plurality of exposure characteristics comprises one or more items of the information that indicate exposure of the data object, and wherein the exposure of the data object comprises accessibility of the data object beyond what is desired by an interested party to the data object; and
   determine an indication of the exposure of the data object based on the plurality of exposure characteristics.

12. The non-transitory computer readable storage medium of claim 11, wherein the instructions that direct the exposure analysis system to determine for the indication of exposure of the data object based on the plurality of exposure characteristics comprise instructions that direct the exposure analysis system to:
   apply a plurality of rules to the plurality of exposure characteristics; and
   generate the indication based on how well the plurality of exposure characteristics comply with the plurality of rules.

13. The non-transitory computer readable storage medium of claim 11, wherein the instructions further direct the exposure analysis system to:
   analyze the information to determine a classification for the data object.

14. The non-transitory computer readable storage medium of claim 13, wherein the classification corresponds to a business unit.

15. The non-transitory computer readable storage medium of claim 11, wherein the instructions further direct the exposure analysis system to:

receive the information about the data object from the cloud computing environment using Application Programming Interface (API) calls for the cloud computing environment to request the information.

16. The non-transitory computer readable storage medium of claim 15, wherein the instructions that direct the exposure analysis system to use API calls for the cloud computing environment to request the information comprise instructions that direct the exposure analysis system to:

impersonate a user associated with the data object, wherein the API calls comprise API calls only available to the user.

17. The non-transitory computer readable storage medium of claim 11, wherein the instructions further direct the exposure analysis system to:

generate a notification of the indication and remedial actions that will improve the exposure if performed.

18. The non-transitory computer readable storage medium of claim 11, wherein the cloud computing environment includes at least two cloud computing services that each maintain a copy of the data object and wherein the instructions further direct the exposure analysis system to:

receive first information of the information about the data object from a first cloud computing service of the cloud computing services; and receive second information of the information about the data object from a second cloud computing service of the cloud computing services.

19. An exposure analysis system for indicating data object exposure in a cloud computing environment, comprising:

a network communication interface configured to receive information about a data object from the cloud computing environment; and a processing system configured to analyze the information to determine a plurality of exposure characteristics for the data object and determine an indication of exposure of the data object based on the plurality of exposure characteristics.

20. The exposure analysis system of claim 19, wherein the processing system configured to determine the indication of exposure of the data object based on the plurality of exposure characteristics comprises:

the processing system configured to apply a plurality of rules to the plurality of exposure characteristics and generate the indication based on how well the plurality of exposure characteristics comply with the plurality of rules.

* * * * *